United States Patent
Lagerberg

(12)
(10) Patent No.: US 6,705,805 B2
(45) Date of Patent: Mar. 16, 2004

(54) CHIP REMOVING MACHINING OF A WORKPIECE WHILE APPLYING HIGH PRESSURE COOLING LIQUID

(75) Inventor: Stig Lagerberg, Sandviken (SE)

(73) Assignee: Sandvik Aktiebolag, Sandviken (SE)

(*) Notice: Subject to any disclaimer, the term of this patent is extended or adjusted under 35 U.S.C. 154(b) by 0 days.

(21) Appl. No.: 10/082,117

(22) Filed: Feb. 26, 2002

(65) Prior Publication Data

US 2002/0122698 A1 Sep. 5, 2002

(30) Foreign Application Priority Data

Feb. 27, 2001 (SE) .............................................. 0100652

(51) Int. Cl.[7] .............................. B23B 1/00; B23B 27/10
(52) U.S. Cl. .......................................... 407/11; 82/1.11
(58) Field of Search .................... 407/11, 5, 6, 113–116; 82/50, 52, 1.11; 408/56

(56) References Cited

U.S. PATENT DOCUMENTS

| | | | | |
|---|---|---|---|---|
| 4,213,354 A | * | 7/1980 | Dahinden | 408/56 |
| 5,341,608 A | * | 8/1994 | Mains, Jr. | 51/320 |
| 5,388,487 A | * | 2/1995 | Danielson | 82/158 |
| 5,439,327 A | | 8/1995 | Wertheim | |
| 5,775,854 A | | 7/1998 | Wertheim | |

FOREIGN PATENT DOCUMENTS

| | | |
|---|---|---|
| DE | 30 04 166 | 8/1980 |
| EP | 0 534 450 | 3/1993 |
| EP | 1 142 669 | 10/2001 |
| JP | 11-320213 | 11/1999 |
| SE | 513 480 | 9/2000 |
| WO | WO99/39852 | 8/1999 |

* cited by examiner

Primary Examiner—Willmon Fridie, Jr.
(74) Attorney, Agent, or Firm—Burns, Doane, Swecker & Mathis, LLP

(57) ABSTRACT

The chip removing machining of a workpiece is performed by a cutting tool which includes a cutting insert. In order to cool the cutting insert, one or more over-cooling nozzles is arranged for directing a jet of cooling liquid downwardly toward a contact area between the workpiece and a chip surface of the cutting insert. A sub-cooling nozzle is arranged for directing a jet of cooling liquid upwardly toward a contact area between the workpiece and a flank surface of the cutting insert. A jet of cooling liquid can be emitted from only the over-cooling nozzle, or from only the sub-cooling nozzle, or from both of those nozzles simultaneously.

13 Claims, 2 Drawing Sheets

CHIP REMOVING MACHINING OF A WORKPIECE WHILE APPLYING HIGH PRESSURE COOLING LIQUID

This application claims priority under 35 U.S.C. §§119 and/or 365 to patent application Ser. No. 0100652-7 filed in Sweden on Feb. 27, 2001, the entire content of which is hereby incorporated by reference.

TECHNICAL FIELD OF THE INVENTION

The present invention relates to a method for chip removing machining, wherein a so-called high pressure cooling is applied. At least one jet of cooling liquid under high pressure is directed towards the contact area between a cutting edge of a cutting insert for chip removing machining and the workpiece that the cutting insert machines. The invention also relates to a cutting tool for chip removing machining.

PRIOR ART

A cutting tool where one or more jets of cooling liquid under high pressure is sprayed in the area between the chip and the chip surface of the cutting insert is previously known from, for instance, Swedish Patent No. 513 480. This type of cooling/chip control henceforth will be denominated as "over-cooling," because the jet is directed downwardly toward the cutting insert from above. The fact is that a jet of cooling liquid under high pressure according to Swedish Patent 513 480 not only provides cooling but also a certain degree of chip control.

Certain types of materials are of the nature that the chips cannot be broken by means of the geometry of the cutting insert. For this reason, the chips leave the cutting edge in the form of long, tangled chips, which may cause interruptions in the machining process as well as also destroy the components being machined. An additional disadvantage is the subsequent chip handling, especially disposal of unwieldy chip tangles, which may mean a risk of injury for the operator.

By supplying one or more jets of cooling liquid under high pressure in the zone between the chip and the chip surface of the cutting insert, a safe and reliable chip control can be obtained. The prerequisite for obtaining such a chip control is, however, that certain characteristics of the jet, i.e., flow, pressure (velocity) and point(s) of impact should be well adapted in relation to the current cutting criteria, i.e., cutting depth, feeding, cutting speed and material properties (hardness, strength and machinability). However, in this connection, it should be pointed out that the jet characteristics which provide an optimum chip control do not always ensure an optimum temperature control/cooling of the chip removing machining.

Among those skilled in the art, different opinions are found as to what is to be regarded as "low" and "high" fluid pressure, respectively. However, generally the classification should be made in the following intervals:

Low pressure<10 bar

Intermediate pressure 10–100 bar

High pressure>100 bar

AIMS AND FEATURES OF THE INVENTION

A primary aim of the present invention is to provide a method and a device of the kind mentioned in the introduction where a satisfactory chip control is provided at the same time as a satisfactory temperature control/cooling is provided. Thereby, an increased, but above all a more predictable, service life of the cutting insert is obtained.

Yet another aim of the present invention is to obtain an improved surface profile on the machined workpiece in comparison to conventional cooling.

One aspect of the invention relates to a method for the chip removing machining of a workpiece. The method utilizes a cutting tool which comprises a cutting insert, an over-cooling nozzle arranged for directing a jet of cooling liquid downwardly toward a contact area between the workpiece and a chip surface of the cutting insert, and a sub-cooling nozzle arranged for directing a jet of cooling liquid upwardly toward a contact area between the workpiece and a flank surface of the cutting insert.

The method comprises the steps of:

A) effecting relative movement between the workpiece and the cutting insert for cutting chips from the workpiece, and B) emitting, during step A, a jet of cooling liquid from at least the sub-cooling nozzle toward the second contact area.

The method can also be practiced by simultaneously emitting jets of cooling liquid from the over-cooling nozzle and the sub-cooling nozzle.

Another aspect of the invention pertains to a cutting tool for the chip removing machining of a workpiece. The tool comprises a seat for a cutting insert, an over-cooling nozzle, and a sub-cooling nozzle. The over-cooling nozzle is arranged for directing a jet of cooling liquid downwardly toward the seat (and thus toward a chip surface of a cutting insert). The sub-cooling nozzle is arranged for directing a jet of cooling liquid upwardly toward the seat (and thus toward a flank surface of a cutting insert).

BRIEF DESCRIPTION OF THE DRAWINGS

Below, two preferred embodiments of the invention will be described, reference being made to the accompanying drawings, where.

DETAILED DESCRIPTION OF PREFERRED EMBODIMENTS OF THE INVENTION

Figure 1:
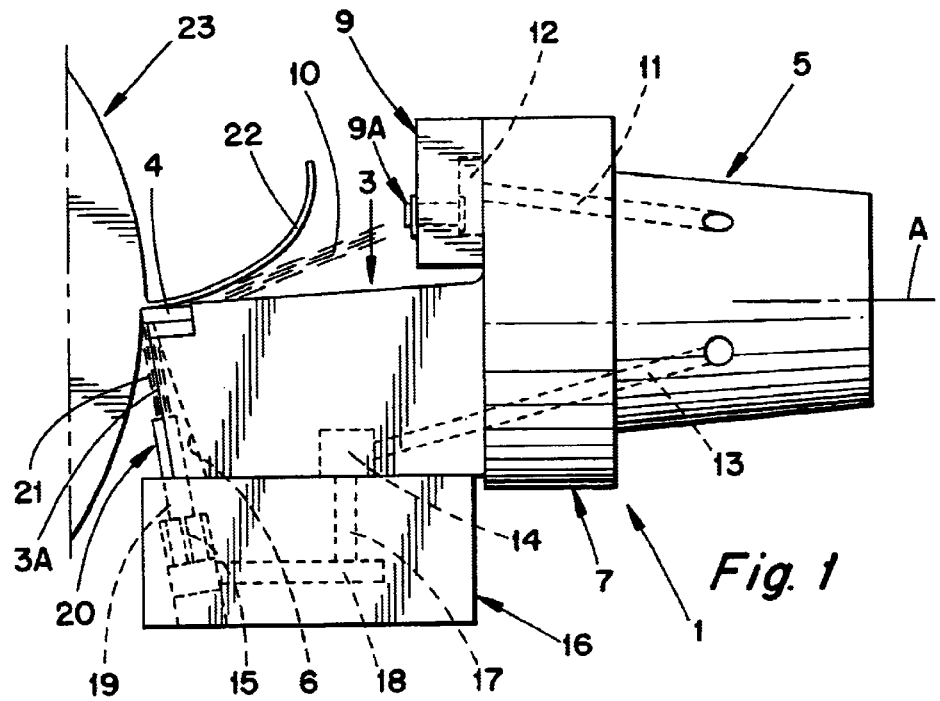
FIG. 1 shows a schematic side view of a device for chip removing machining according to a first embodiment of the invention, the supply of cooling liquid being carried out via a cone-shaped holder part.

The cutting tool 1 illustrated in FIG. 1 for chip removing machining comprises a front part 3, which has a cutting seat for a replaceable indexable insert 4. A rear part 5 of the cutting tool 1 is formed as a male part, which is intended to be received in a holder (not shown) of a machine tool. The rear part 5 may be of any suitable shape. For instance, in FIG. 1 the rear part 5 has the shape of a truncated cone. Between the front part 3 and the rear part 5, a flange 7 is arranged, said flange forming a stop face against the holder and can be formed with members for effecting automatic tool exchange.

As is seen in FIG. 1, the cutting tool 1 is provided with a plate-shaped nozzle carrier 9, which is applied on the side of the flange 7 facing the front part 3. In the nozzle carrier 9, one or more first or upper nozzles 9A (only one shown) is mounted, whereby said first nozzle sprays a first jet of liquid 10, with high pressure, obliquely from above towards the replaceable indexable insert 4.

Figure 3:
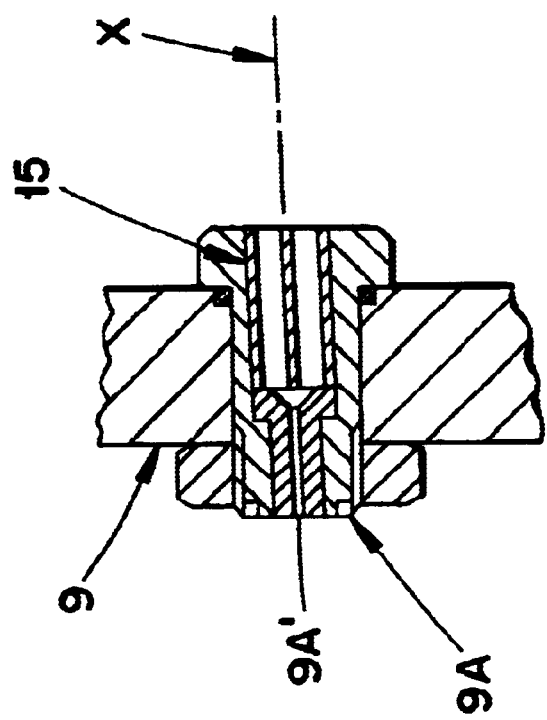
FIG. 3 is a cross sectional view through an over-cooling nozzle.

The first nozzle 9A is preferably of the adjustable type, i.e., the direction of the jet which exits from the nozzle is adjustable. One way of adjusting the direction of the jet is shown in FIG. 3 and described in U.S. Ser. No. 09/654,989, the disclosure of which is incorporated by reference herein. That is, the nozzle 9A is made to be rotatable about its longitudinal axis, and an outlet 9A' of the jet is non-parallel to the axis, whereby the direction of the jet changes in response to rotation of the nozzle 9A. Alternatively, or additionally, the nozzle outlet could be offset from the axis.

Figure 4:
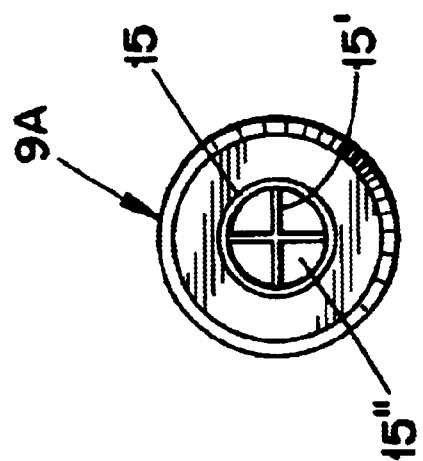
FIG. 4 is a rear view of the nozzle depicted in FIG. 3, i.e., a view looking from right-to-left in FIG. 3.

Preferably, the nozzle carrier 9 is also provided with conventional flow stabilizers 15, normally one for each first nozzle. The flow stabilizer 15, which is depicted in FIGS. 3 and 4, and also described in the aforementioned Ser. No. 09/654,989, functions to divide the flow of liquid into a number of partial flows. Thus, the stabilizer can comprise a generally cylindrical insert having a series of radial wings 15' which divide the nozzle interior into separate passages 15" (e.g., four passages in FIG. 4). By dividing the flow in that manner, the tendency of the liquid to become turbulent is counteracted.

This type of high pressure cooling is denominated "over-cooling", since the cooling jet is directed downwardly toward the insert. A first channel 11 is arranged for the supply of liquid to the nozzle carrier 9, said channel extending between the envelope surface of the rear part 5 and a first cavity 12 in the nozzle carrier 9. The first channel 11 thus passes through the flange 7. One of the ends of the first channel 11 ports in the front surface of the flange 7, more precisely in the cavity 12 behind and at a distance from the first nozzle 9A. As to how cooling liquid is supplied to the first channel 11, how cooling liquid is transferred from the first front end of the channel 11 to the first nozzle, (via the cavity 12), and how cooling liquid is sprayed out through the first nozzle towards the indexable insert 4, reference is made to the afore-mentioned U.S. Ser. No. 09/654,989, which also shows how a plurality of the first nozzles can be provided.

The cutting tool according to the present invention also comprises a second channel 13, which extends from the envelope surface of the rear part 5 to a second cavity 14 at the bottom of the front part 3. In the embodiment according to FIG. 1, one of the afore-described stabilizers 15 is arranged, which is included in a housing 16, which is applied at the bottom of the front part 3. A third channel 17, a fourth channel 18 and a fifth channel 19 are also arranged in the housing 16. The third channel 17 extends from the second cavity 14 to one end of the fourth channel 18, the other end of which joins to the flow stabilizer 15. The fifth channel 19 is situated downstream of the flow stabilizer 15, said fifth channel 19 extending from the outlet of the flow stabilizer 15 to a second nozzle 20, by means of which cooling liquid is sprayed upwardly towards the indexable insert 4.

In the embodiment illustrated in FIG. 1, the nozzle 20 is applied in a groove 6 on the front part 3. In that connection, the nozzle 20 is partly countersunk in the groove 6. Normally, said nozzle 20 is fixed, i.e., the direction of the second liquid jet leaving the second nozzle 20 under high pressure is not adjustable. The second liquid jet leaving the nozzle 20 is schematically illustrated in FIG. 1 and has been given the reference designation 21. This type of high pressure cooling is denominated "sub-cooling" because the cooling liquid is directed upwardly from below the cutting insert. Supply of cooling liquid to the second channel 13 is carried out in principally the same way as the supply of cooling liquid to the first channel 11.

It will thus be appreciated that the tool body defines a longitudinal axis A, and that the front part 3 and the rear part 5 define a cutting portion and a mounting portion, respectively, situated along the axis. The cutting portion projects forwardly with respect to the mounting portion and includes a forward free end portion in which the insert seat is disposed. The forward free end portion terminates in a generally forwardly facing front surface 3A disposed beneath the insert seat. The sub-cooling nozzle seat, as well as forwardly of and below the over-cooling nozzle 9A.

The cutting tool 1 described in FIG. 1 works principally in the following way. When the cutting tool 1 is mounted in a holder (not shown), chip removing machining may be carried out by means of the indexable insert 4 by establishing relative rotary movement between the insert and the workpiece. As shown schematically in FIG. 1, a chip 22 is about to be separated from a workpiece 23. In doing so, heat will be generated, i.e., there is a need for supplying cooling liquid, which may take place by means of the first and second nozzles 9A, 20 of the above-described cutting tool 1.

As is apparent from the description above, the cutting tool 1 according to the present invention permits the cooling liquid to be directed toward the point of cutting in respective directions from above and below the insert. In so doing, cooling liquid is supplied to the first channel 11 and the second channel 13, the cooling medium being supplied from the first channel 11 further to the first cavity 12 and then, by means of high pressure, out through the first nozzle 9A to effect cooling and chip control. Cooling liquid under high pressure is also supplied further through the second channel 13, through the second cavity 14, the third channel 17, the fourth channel 18, the flow stabilizer 15 and the fifth channel 19. Then, liquid under high pressure is sprayed out through the second nozzle 20, the liquid meeting the point of cutting from below and guaranteeing cooling of the point of cutting as well as also a certain chip control of the chip 22 released from the workpiece 23.

Figure 2:
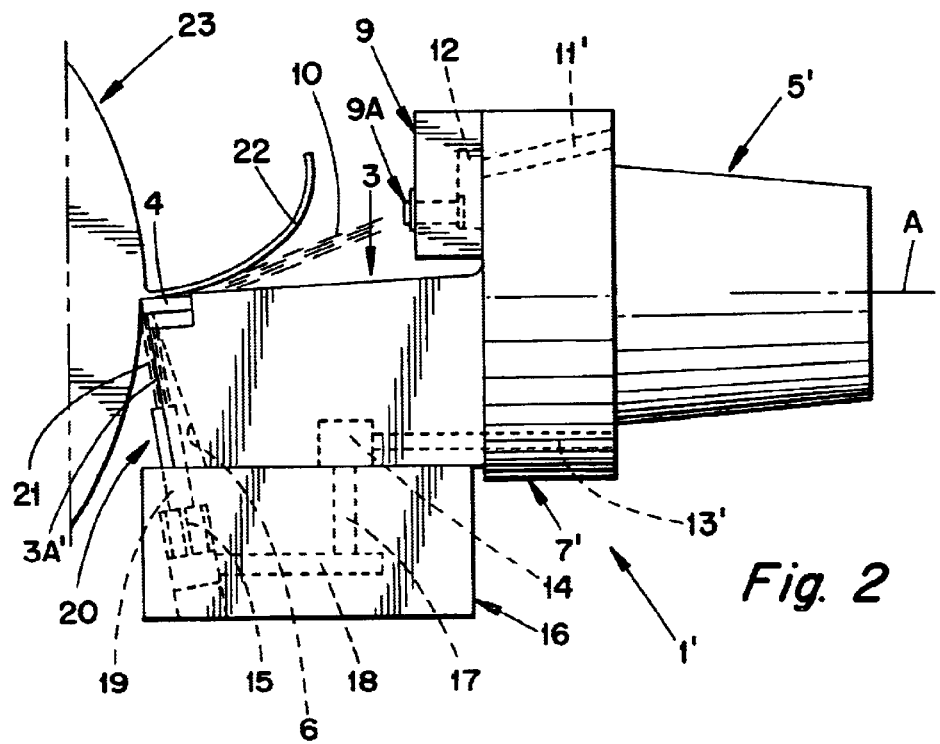
FIG. 2 shows a schematic side view of an alternative device for chip removing machining according to a second embodiment of the invention, the supply of cooling liquid being carried out by a flange intake.

In an alternative embodiment of a cutting tool 1' according to the present invention illustrated in FIG. 2, said cutting tool has a so-called flange intake, i.e., the first and second channels 11', 13' extend through the flange 7' of the cutting tool 1', but not through the male part 5'. This means that the male part 5' of the cutting tool 1' is not intersected by channels for cooling liquid under high pressure. As for the design of the plate-shaped nozzle carrier 9, it is made in principally the same way as in the embodiment according to FIG. 1, however, cooling liquid passes to the first channel 11' connecting to the first cavity 12 through the flange 7'.

The channels, the cavity, the flow stabilizer and the nozzle for sub-cooling are made in principally the same way as in the embodiment according to FIG. 1. However, cooling liquid passes to the second channel 13' connected to the second cavity 14 through the flange 7'. In this connection, it should be pointed out that when the male part 5' of the cutting tool 1' according to FIG. 2 is mounted in a female part of a holder, the flange 7' will abut against a stop face of the holder. The stop face is intersected by a number of channels corresponding to the number of first and second channels 11', 13' in the flange 7'. When the male part 5' is received in the female part, the flange 7' abuts against the stop face. When liquid under high pressure is to be transferred to the flange 7', the same will be exposed to an axial force aiming to separate the flange 7' from the stop face of the holder, which in such a case makes the effective pressure of the liquid leaving the nozzles drop. The axial force acting on the flange 7' is proportional to the pressure of the liquid that is to pass between the flanges. In the embodiment illustrated in FIG. 2, there normally is a limitation in this pressure.

In accordance with the present invention, a cutting operation can be performed using the over-cooling jet alone, or the sub-cooling jet alone. However, in many types of cutting operations, the simultaneous use of the over-cooling jet and the sub-cooling jet is necessary in order to obtain an optimum chip control in combination with an optimum cooling/temperature control.

FEASIBLE MODIFICATIONS OF THE INVENTION

The cooling liquid, which is used in the present invention, is normally a conventional cooling liquid. However, it is feasible within the scope of the invention also to use water as a cooling liquid, if so, a corrosion inhibitor is added.

In the above-described embodiments, only one second nozzle 20 is arranged to guarantee sub-cooling. However, it is feasible within the scope of the invention also to provide a plurality of second nozzles, whereupon the number of connecting channels and other auxiliary equipment must be adjusted to the number of second nozzles. Of course, also the number of first nozzles may be varied within the scope of the present invention.

The male part 5, 5' included in the above-described embodiments is of truncated conical shape, the same preferably consisting of a male part of a tool coupling which is marketed under the trademark COROMANT CAPTO®. However, within the scope of the present invention alternative designs of the holder for the cutting tool are conceivable, in an exemplifying and not limiting purpose, the KM® coupling may be mentioned.

In the two above-described embodiments, flow stabilizers are arranged adjacent to respective the over-cooling nozzle 9A and the subcooling nozzle 20. However, it is feasible within the scope of the invention that the cutting tool according to the present invention entirely lacks flow stabilizers or that only the over-cooling nozzle or only the sub-cooling nozzle is provided with a flow stabilizer.

In the above-described embodiments, the over-cooling nozzle 9A is adjustable to vary the direction of the jet, while the jet of the sub-cooling nozzle 20 is fixed (non-adjustable). The reason for this is that a precisely directed jet flow is normally not required for the nozzle 20 since the sub-cooling is not intended to have a mechanical effect on the chip released from the workpiece. However, it is feasible within the scope of the invention for all nozzles to be fixed or that all nozzles be adjustable.

An additional feasible alternative is that the sub-cooling nozzle 20 could be fixed, but the housing 16 which carries the nozzle 20 could be somewhat axially adjustable.

Normally, the supply of cooling liquid is carried out under high pressure from a common pressure source, i.e., the pressure in the jets of liquid is mainly the same irrespective of whether they are performing over-cooling or sub-cooling. However, the pressure in the jet or jets of liquid which carry out over-cooling need not be the same as the pressure in the jet or jets of liquid which carry out sub-cooling. If different pressures are to be provided, this may be effected by means of a pressure regulator. The jet or jets of liquid which carry out over-cooling have a pressure which is in the high pressure range, i.e., higher than 100 bar. This is in principle necessary if a mechanical effect is to be made on the chip released from the work piece. As for the jet or jets of liquid which carry out sub-cooling, these may have a pressure which is in the intermediate pressure range, i.e., higher than 10 bar but lower than 100 bar, or in the high pressure range, i.e., higher than 100 bar. It should however be advantageous if the jet or jets of liquid which carry out sub-cooling have a pressure within the high pressure range, whereby the risk for a vapor barrier being formed in the area between the release side of the cutting insert 4 and the workpiece 23 is reduced.

What is claimed is:

1. A method for the chip removing machining of a workpiece, utilizing a cutting tool comprising a a tool body defining a longitudinal axis and including a mounting portion and a cutting portion situated along an axis, the cutting portion projecting from the mounting portion in a direction constituting a forward direction and having a forward free end at which is mounted a cutting insert, the cutting insert including a generally upwardly facing chip surface and a generally forwardly facing flank surface, and a cutting edge disposed at a transition between the chip face and the flank surface, an over-cooling nozzle arranged for directing a jet of cooling liquid downwardly and forwardly toward a first contact area between the workpiece and the chip surface of the cutting insert, and a sub-cooling nozzle arranged at a generally forwardly facing front surface of the forward free end portion and situated forwardly of and below the over-cooling nozzle for directing a jet of cooling liquid upwardly from beneath the seat toward a second contact area between the workpiece and the flank surface of the cutting insert, the method comprising the steps of:
   A) effecting relative movement between the workpiece and the cutting insert for cutting chips from the workpiece, and
   B) emitting, during step A, first and second jets of cooling liquid from the over-cooling nozzle and the sub-cooling nozzle, respectively, the first jet traveling downwardly and forwardly toward the first contact area, and the second jet traveling upwardly toward the second contact area from a location disposed forwardly of and below the over-cooling nozzle and beneath the insert.

2. The method according to claim 1 wherein the jet of cooling liquid from the over-cooling nozzle is emitted at a pressure greater than 100 bar, and the jet of cooling liquid from the sub-cooling nozzle is emitted at a pressure lower than 100 bar.

3. The method according to claim 1 wherein each of the jets of cooling liquid from the over-cooling and sub-cooling nozzles are emitted at a pressure greater than 100 bar.

4. A cutting tool for the chip removing machining of a workpiece, comprising:
   a tool body defining a longitudinal axis and including a mounting portion and a cutting portion situated along an axis, the cutting portion projecting with respect to the mounting portion in a direction constituting a forward direction, and having a forward free end portion in which there is disposed a seat for a cutting insert, the forward free end portion including a front surface facing generally forwardly and disposed beneath the seat;
   an over-cooling nozzle arranged rearwardly of, and above, the forward free end portion for directing a jet of cooling liquid downwardly and forwardly toward the seat; and
   a sub-cooling nozzle arranged at the front surface and disposed beneath the seat and both forwardly of and below the over-cooling nozzle for directing a jet of cooling liquid upwardly toward the seat.

5. The cutting tool according to claim 4 further including a cutting insert mounted in the seat; the insert including an upwardly facing chip surface, a generally forwardly facing flank surface, and a cutting edge disposed at a transition between the chip and flank surfaces; wherein the over-cooling nozzle is arranged to direct its jet toward the chip surface of the insert, and the sub-cooling jet is arranged to direct its jet toward the flank surface of the insert.

6. The cutting tool according to claim 5 wherein the mounting portion including includes channels formed therein and is arranged to conduct cooling liquid for the over-cooling nozzle and the sub-cooling nozzle, respectively.

7. The cutting tool according to claim 4 wherein the tool body further includes a flange disposed between the cutting portion and the mounting portion; wherein the cutting portion projects forwardly from the flange, the sub-cooling nozzle spaced forwardly of the flange.

8. The cutting tool according to claim 4 wherein the over-cooling nozzle is adjustable to vary a direction of the cooling jet emitted therefrom.

9. The cutting tool according to claim 8 wherein the sub-cooling nozzle is fixed.

10. The cutting toot according to claim 8 wherein the sub-cooling nozzle is adjustable to vary a direction of the cooling jet emitted therefrom.

11. The cutting tool according to claim 4 further including a flow stabilizer disposed upstream of the over-cooling nozzle.

12. The cutting tool according to claim 11 further including a flow stabilizer disposed upstream of the sub-cooling nozzle.

13. The cutting tool according to claim 4 further including a flow stabilizer disposed upstream of the sub-cooling nozzle.

* * * * *